United States Patent [19]

Harrison et al.

[11] 4,108,194

[45] Aug. 22, 1978

[54] METHOD AND APPARATUS FOR A TAPERED PIPELINE SEAL

[75] Inventors: George W. Harrison; Charles O. Huff, both of Houston, Tex.

[73] Assignee: Team, Inc., Alvin, Tex.

[21] Appl. No.: 726,813

[22] Filed: Sep. 27, 1976

[51] Int. Cl.² ............................................. F16L 55/07
[52] U.S. Cl. .................................... 137/15; 137/318; 137/323; 138/94
[58] Field of Search ............... 137/15, 317, 318, 323, 137/320; 251/184; 138/94, 89

[56] References Cited

U.S. PATENT DOCUMENTS

| 937,958 | 10/1909 | Phillips | 137/323 |
|---|---|---|---|
| 1,369,390 | 2/1921 | Bruns | 137/323 |
| 3,091,260 | 5/1963 | Milanovits et al. | 138/94 |
| 3,799,182 | 3/1974 | Long | 138/94 |
| 3,948,282 | 4/1976 | Yano | 137/318 |

*Primary Examiner*—Richard E. Aegerter
*Assistant Examiner*—L. Footland
*Attorney, Agent, or Firm*—Guy E. Matthews

[57] ABSTRACT

A method and apparatus for a tapered pipeline seal includes a means for enabling a line to be sealed with a rotatable tapered sealing plug or apparatus.

2 Claims, 6 Drawing Figures

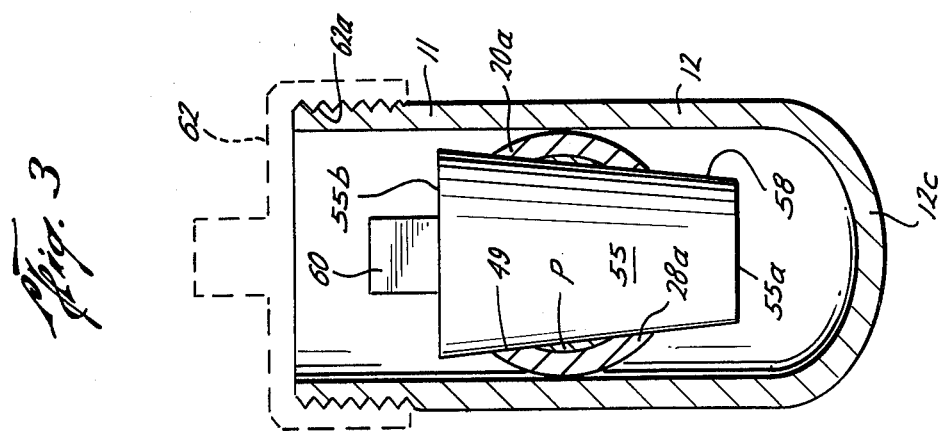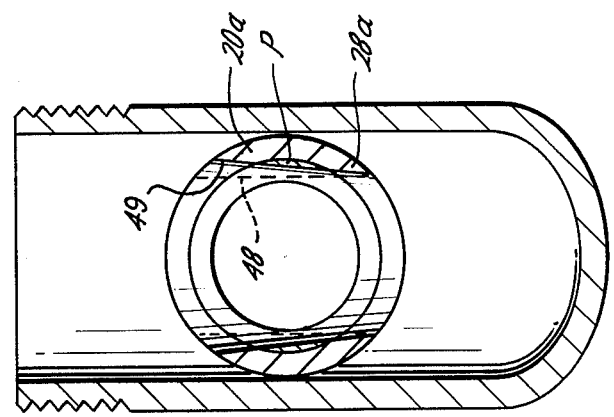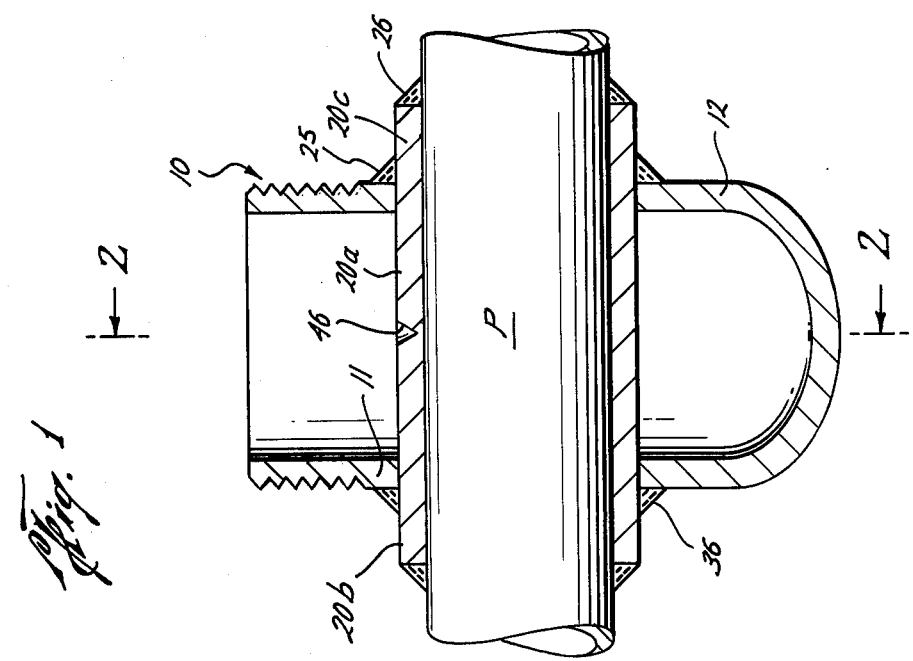

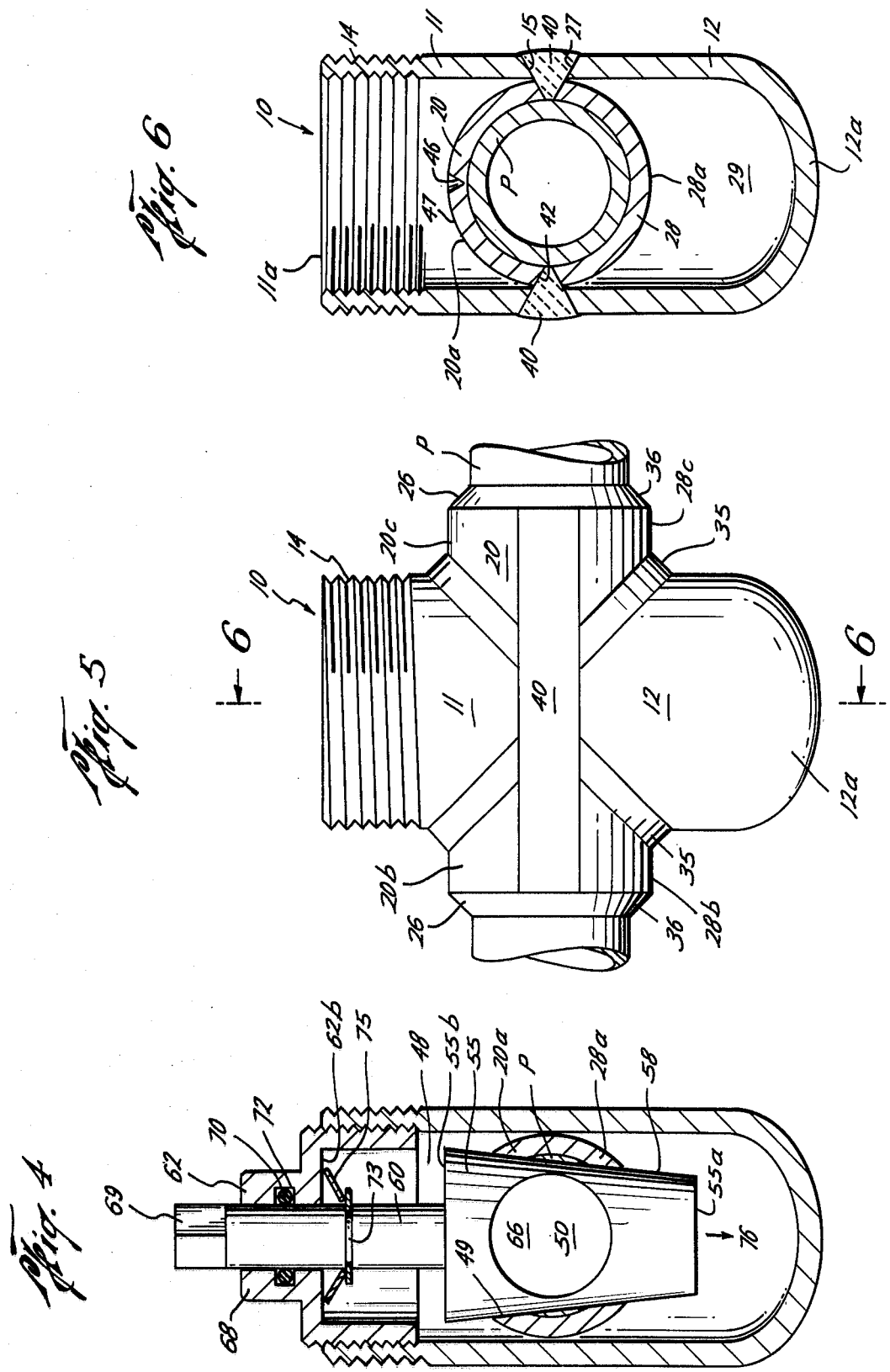

METHOD AND APPARATUS FOR A TAPERED PIPELINE SEAL

SUMMARY OF THE INVENTION AND RELATION TO PRIOR ART

Briefly, the present invention relates to a new and improved method and apparatus for a tapered pipeline seal including a new and improved method and apparatus for enabling mounting of first and second arcuate and transverse sections around a pipeline, reaming out a portion of the arcuate sections and the pipeline and thereafter inserting a tapered seal therein for continually sealing the longitudinal bore of the pipeline.

In the prior art, if it was desired to plug a line or modify a line, it was necessary to use highly complicated and sophisticated equipment for plugging such line. Also, on occasions, the plug or apparatus which plugged the interior of the line did not achieve a sufficient seal between the plugging member and the interior of the line such that the sealing means was usually not effective.

It is an object of the present invention to provide a method and apparatus for a tapered pipeline seal wherein an effective safe and economic seal is achieved between the plugging member and the interior of the pipeline.

BRIEF DESCRIPTION OF THE DRAWINGS

FIG. 1 is a view partly in section illustrating the two half sections suitably connected to the pipeline;

FIG. 2 is a sectional view taken along line 2—2 of FIG. 1 illustrating the tapered opening reamed through the housing and pipeline;

FIG. 3 is a view similar to FIG. 2 illustrating the tapered plugging member in position;

FIG. 4 is a view similar to FIG. 3 illustrating rotation of the plugging member and sealing means mounted with the housing;

FIG. 5 is a perspective view of the housing section of the present invention mounted to the pipeline; and FIG. 6 is a sectional view taken along line 6—6 of FIG. 5 illustrating mounting of the first and second housing sections with the pipeline.

DESCRIPTION OF THE INVENTION

As illustrated in FIGS. 1, 5 and 6, the present invention includes a housing generally illustrated by the numeral 10 which includes a first half or transverse section 11 and a second half or transverse section 12. The housing 11 includes exterior threads 14 at one end thereof and an inwardly tapered end 15.

Housing 11 also includes arcuate member 20 which extends transversely relative to the section 11 as illustrated in FIGS. 1 and 2 such that the exterior portion 20A of the arcuate member 20 extends arcuately outwardly toward the end 11A of housing 11 (FIG. 6) and such that sections 20B and 20C of the arcuate member 20 extend transversely outwardly from such housing 11 and parallel to the pipeline P. As further illustrated in FIGS. 1 and 5, housing 11 and arcuate member 20 are suitably mounted and connected with each other by welding as at 25. As further illustrated in FIGS. 1 and 5, the longitudinal member 20 is also welded to the pipeline P and extends longitudinally therewith, such welds being illustrated at 26.

The second transverse section 12 includes a closed end 12A and an inwardly tapered end 27 (FIG. 6). A second arcuate member 28 is positioned with housing 12 similar to the positioning of arcuate member 20 relative to housing 11 such that the section 28A of arcuate member 28 extends arcuately outwardly in the interior 29 of the housing 12 toward the end 12A thereof and further extends transversely to the housing 12 such that end 28B and 28C extend outwardly from the housing 12 with such section 28A being positioned in the interior 29 of the housing 12. As further illustrated in FIGS. 1 and 5, the arcuate member 28 is mounted transversely with housing 12 by suitable welding or other means as illustrated at 35 and the arcuate member 28 is further mounted longitudinally and exteriorly parallel with the pipeline P at welds 36 which correspond and are similar to welds 26.

As illustrated in FIGS. 1, 5 and 6, the housing sections 11 and 12 and arcuate members 20 and 28 mounted therewith, respectively, are welded together relative to the pipeline P to form the housing generally illustrated at 10 by, as set forth hereinabove, welding the arcuate sections 20 and 28 to the pipeline P through welds 26, 36 and by further including two lateral welds 40 which fixedly connect the ends 15 and 27 of housings 11 and 12, respectively with the arcuate sections 20 and 28, respectively, and to the pipeline P at a point 42 as illustrated in FIG. 6. Thus, with the housing sections 11 and 12 joined together around the pipeline P, the pipeline P is ready to be tapped for insertion of a suitable plugging apparatus as will be further illustrated hereinbelow. Further, with the arcuate sections 20 and 28 secured to each other around the pipeline P, section 20 and 28 form a sheath around the line and, as illustrated the transverse sections 11 and 12 are axially aligned with each other.

As illustrated in FIGS. 1 and 6, a suitable tapp guide hole 46 is positioned on the exterior 47 of the arcuate section 20A in the interior 48 of housing section 11 to enable suitable drilling and reaming operations to occur. As is well known in the art, a suitable hole is drilled through section 20A, the pipeline P and section 28A as illustrated by the dotted line 48 (FIG. 2) the guide hole 46 assures that the opening 50 through the arcuate sections 20A and 28A and pipeline P is aligned with sections 11 and 12 and is a straight drilled hole illustrated by the dotted lines 48. Thereafter, a suitable reamer is inserted to ream the edges of the hole 50 outwardly such that the hole 50 is then defined by the tapered walls 49 extending through the sections 20A and 28A and pipeline P.

As further illustrated in FIGS. 3 and 4, a tapered pipeline plugging member 55 is thereafter inserted into the tapered opening 50 defined by the interior walls 49 to provide a suitable seal across the pipeline P. The plugging member 55 is illustrated as including an end 55A which extends through the opening 50 into the interior 29 of housing 12 and an exteriorly tapered surface 58 with the plugging apparatus 55 being smaller at the end 55A than at the opposite end 55B such that the exterior surface 58 extends outwardly from its end 55A to its end 55B and such that the exterior tapered surface 58 conforms to the tapered interior surface walls 49.

A suitable shaft member 60 is mounted with the end 55B of the plugging apparatus 55 for enabling positioning of the plugging apparatus 55 in the tapered opening 49 for plugging of the pipeline P. As further illustrated a cap member 62 includes interior threads 62A for threadedly engaging with the exterior threads 14 on housing 11 to suitably seal the end 11A of housing 11.

As illustrated in FIG. 4, another embodiment of the plugging apparatus 55 is illustrated and is similar in shape and configuration to the plugging apparatus 55 illustrated in FIG. 3, including the fact that the tapered walls 58 sealingly engage the tapered interior walls 49. In this embodiment, the plugging apparatus is provided with an opening 66 therethrough which communicates with opening 50 through the longitudinal bore of pipeline P and arcuate sections 20 and 28. The shaft 60 extends outwardly through the cap 62 and through the exterior head 68 and is capable of rotation about is end 69. Suitable O-ring and bearing seals 70 are positioned in grooves 72 of the head 68 to permit rotation of the shaft 60 and also maintain sealing engagement around such shaft 60 to prevent any unnecessary leaks.

A suitable tension or biasing means includes a retainer member 73 mounted around the exterior of the shaft 60 in the interior 48 of housing 11 for biasing and maintaining the tension arms 74 which extend upwardly to the interior wall 62B of the cap 62 and which arms 74 are maintained under tension against such interior wall 62B to continually force the shaft member 60, and plugging apparatus 55 downwardly in the direction of the arrow 76 to maintain the seal between the plug 55 and the arcuate sections 20 and 28 and pipeline member P.

If it is desired to enable the openings 66 and 50 to be axially aligned and to communicate with the longitudinal bore in the pipeline, the end 69 of shaft 60 is rotated to align such opening 66 and 50 with the opening in the pipeline P. If it is thereafter desired to seal the interior of the pipeline and prevent the openings 55 and 60 from communicating with the bore of pipeline P, the end 69 of shaft 60 is rotated to move the opening 66 out of alignment with the opening 50 which thus imparts rotation to the tapered plugging member 55 to thereafter seal and prevent communication in the pipeline P. It is to be understood that the method and apparatus of the present invention illustrated in FIGS. 1–6 is exemplary only and that the scope of the present invention is not intended to be limited to the specific apparatus disclosed but includes any and all variations and modifications not limited by the prior art.

We claim:

1. A method of sealing a longitudinal bore in a pipeline including the steps of:
   (a) forming a housing for mounting with a pipeline, said housing including two sections;
   (b) said method of forming said sections including the steps of:
      positioning and securing longitudinal arcuate members relative to the pipeline with transversely positioned communication members; and
   (c) mounting said first and second sections around the pipeline such that the arcuate members are mounted with and parallel to each other around the pipeline to form a sheath and wherein the communication members mounted with each of said arcuate sections are axially aligned with each other and transverse to the sheath and pipeline;
   (d) drilling and reaming a tapered hole in the communication members and through and transverse to the arcuate members and pipeline such that the communication members are enabled to communicate with each other through such tapered opening;
   (e) inserting a tapered plug into the tapered hole to prevent communication between the longitudinal bore of the pipeline to thereby seal off the bore of the pipeline.

2. The method as set forth in claim 1 wherein the tapered plug includes a bore therethrough and wherein rotation of the tapered plug to align the bore therein with the bore of the pipeline enables flow through said pipeline and wherein rotation of the tapered plug such that the bore therein is out of alignment with the bore in the pipeline thereby seals off the bore in the pipeline.

* * * * *